United States Patent [19]

Ishimoto

[11] Patent Number: 5,228,235
[45] Date of Patent: Jul. 20, 1993

[54] APPARATUS FOR PROMOTING THE GENERATION OF ORGANIC COMPOUNDS FROM TREES

[75] Inventor: Shoichi Ishimoto, Chiba, Japan

[73] Assignee: Sinrin Seiki Sangyo Co., Ltd., Chiba, Japan

[21] Appl. No.: 672,850

[22] Filed: Mar. 21, 1991

[30] Foreign Application Priority Data

Apr. 4, 1990 [JP] Japan ............... 2-36789[U]

[51] Int. Cl.⁵ ............................................. A01G 31/00
[52] U.S. Cl. ............................................. 47/60; 47/39; 47/65
[58] Field of Search ....................... 47/60, 65, 39

[56] References Cited

U.S. PATENT DOCUMENTS

| | | | |
|---|---|---|---|
| 986,875 | 3/1911 | Tilghman | 47/39 |
| 1,885,117 | 11/1932 | Lemert | 47/39 |
| 2,950,567 | 8/1960 | Newman | 47/79 |
| 3,492,761 | 2/1970 | Taylor | 47/60 EC |
| 3,909,978 | 10/1975 | Fleming | 47/65 D |
| 4,250,666 | 2/1981 | Rakestraw | 47/37 |
| 4,605,000 | 8/1986 | Anguita | 47/60 E |

FOREIGN PATENT DOCUMENTS 118744 9/1918 United Kingdom ............... 47/39

Primary Examiner—Henry E. Raduazo
Attorney, Agent, or Firm—David O'Reilly

[57] ABSTRACT

An apparatus for promoting generation of exhaled organic compounds from trees comprised of a potted tree container, a pot stand means mounted on the bottom of the container, the pot stand means is comprised of a plurality of trees in pot trays arranged at intervals so that contact can be made between branched of adjacent trees. A water supply for supplying water to potted trees is provided and an illuminator is mounted in container with, apparatus for rotating all or a part of pot trays. An air suction port for sucking air into the potted tree container, and an air exhaust system for discharging air containing volatile organic compounds released by the potted trees into the interior of a room are provided. All or a part of trees are rotated while in contact with each other such that each tree is mechanically stimulated by an adjacent tree so that the stimulation from adjacent trees increases the amount of volatile organic compounds released from the trees. The atmosphere including the volatile organic compounds from the trees is delivered to a living space to activate physiology well being of a human and stabilize one's mind.

19 Claims, 5 Drawing Sheets

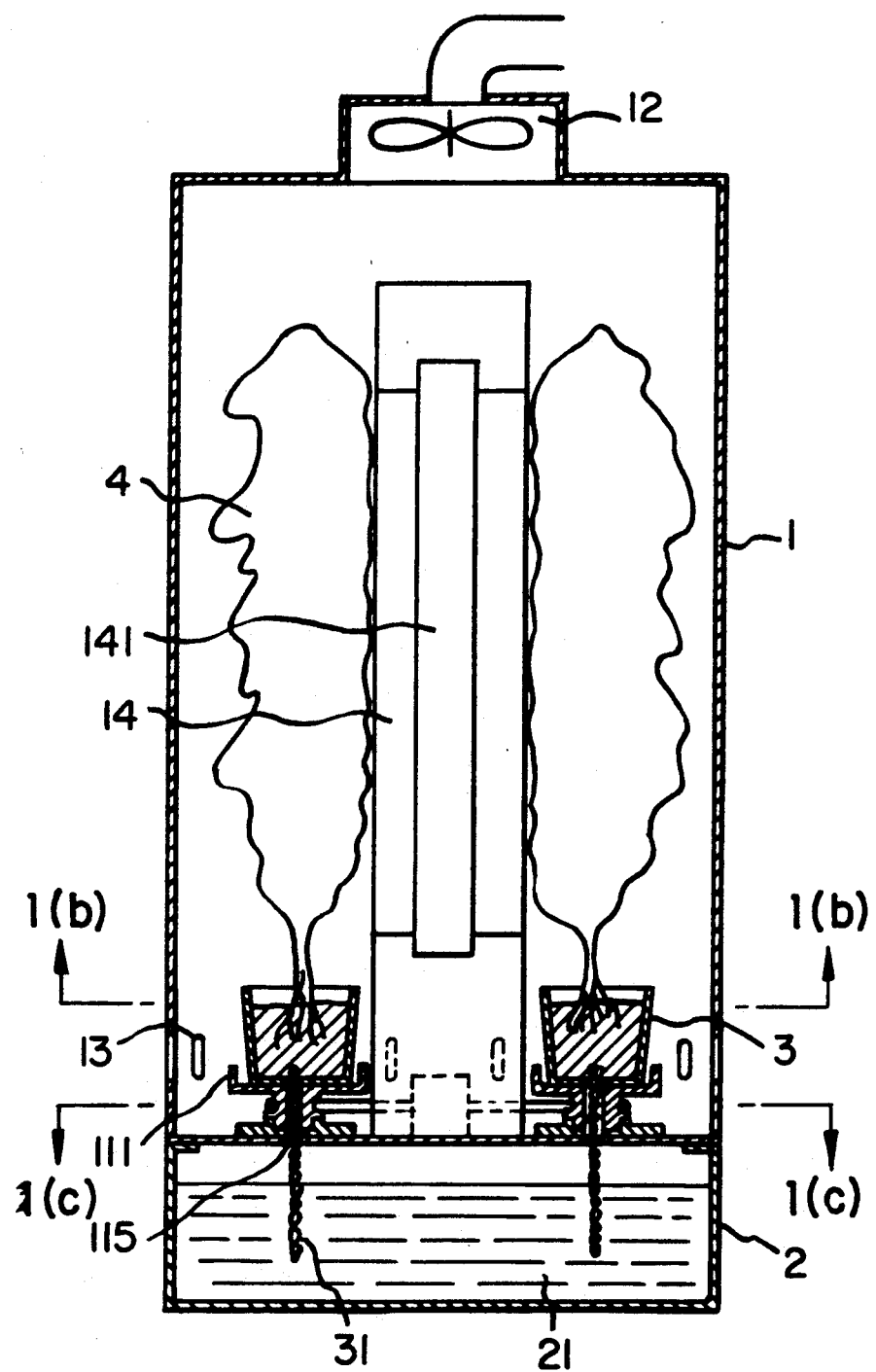

FIG. I(b)
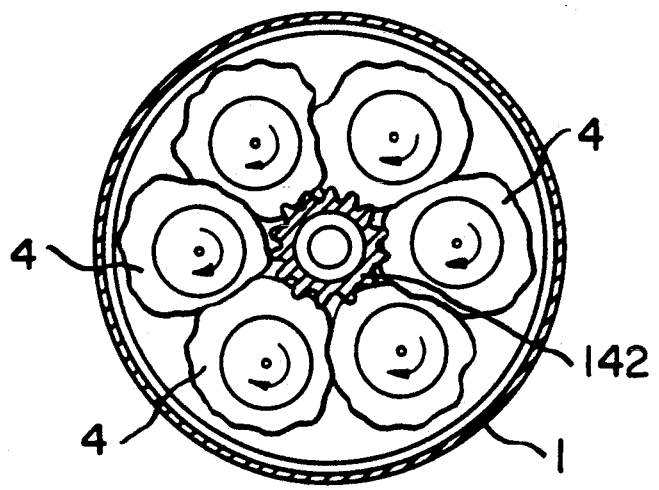
FIG. I(c)
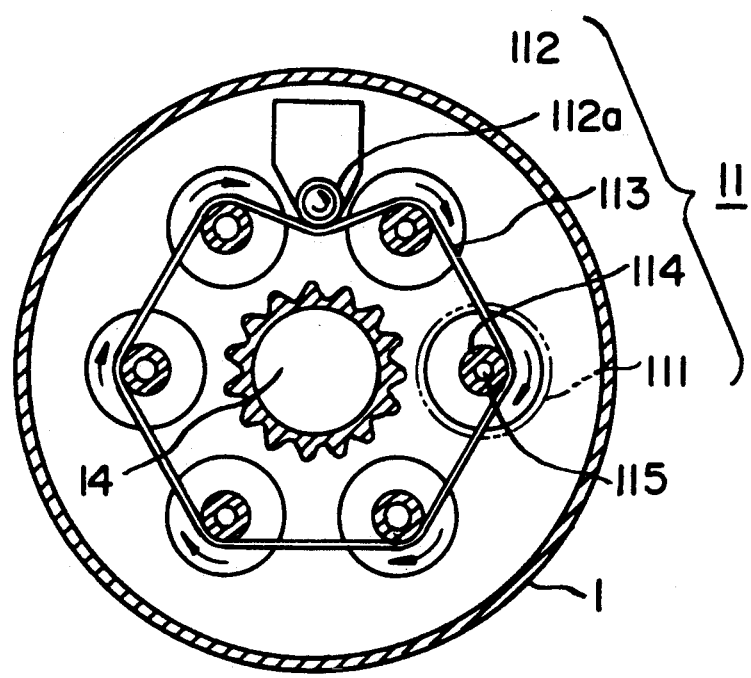

APPARATUS FOR PROMOTING THE GENERATION OF ORGANIC COMPOUNDS FROM TREES

BACKGROUND OF THE INVENTION

1. Field of the Invention

The present invention relates to an apparatus for promoting generation of exhaled organic compounds from trees, and more particularly to an apparatus for promoting the generation of volatile organic compounds from trees, in order to improve one's living environment and to form a living space good for the mind and body by introducing into the living space of a building the essence generated from the trees in a manner like the generation of an essence from trees is observed in a forest.

2. Description of the Prior Art

In recent years there is a gravitation of population toward the cities with the development of science, technology and industry by which one's living environment, particularly the air environment, is gradually worsening.

Biological activities of trees in a forest purifies the air by adsorption of injurious gases existing in the air environment and by supplying oxygen into so that a good environment for life conservation and living activities is formed.

That is, it is known that injurious substances such as fine dust, NOx, SOx etc. in the air adheres to trees so that these injurious substances are removed from the air, while oxygen is supplied from trees. Also volatile organic compounds (phytoncide) such as hydrocarbons, monoterpene, sesquiterpene, etc., are combined with hydroxyl or aldehyde groups, diterpene, phenolic compounds and so forth are discharged by trees. It is believed that these volatile organic compounds discharged by trees influence human physiological activity such as mental tranquility, mental composure, awareness, blood pressure, muscular strength, breathing, digestion in the stomach and intestine, urination, sterization, insecticide, etc., and contribute to forming a better environment for human life.

However, lately, due to the cityward drift of the population, it becomes more and more difficult to restore the environment polluted by human life waste and by environmental disruption, such as air pollution caused a great many people living in the cities so that the life environment is gradually worsening.

As a means for improving the worsening air conditions in the cities, heretofore, filters are employed by which floating matter in the air within a room is removed, or smells or the like are removed through activated carbon. These means are effective in their way. However, in these cases, while injurious matter can be removed, ingredients discharged from trees in a forest which act on human physiological activity cannot be supplied into a room.

Further, lately, perfume or essential oils extracted from trees are supplied through an air conditioning apparatus or the like into a room with a view to improving the indoor environment. However, in this case, only a part of the exhaled ingredients discharged from trees is supplied which does not have the same effect that one can have that bathes in the essence discharged from forest trees.

Further potted plants are put in houses, office rooms, etc. However these aim to improve the appearance of an environment, but cannot give the amount of exhaled tree ingredients to a life space to the same extent as exhaled ingredients from trees in a forest act on human physiological activity.

For the above-mentioned reasons, it is desired that a space for human life be formed in the same manner as a forest environment and there is a need to develope as artificial forest formed in a small space from which a lot of beneficial ingredients from trees can be discharged.

SUMMARY OF THE INVENTION

An object of the present invention is to provide an artificial forest formed in a small space from which a lot of beneficial ingredients from trees can be discharged.

The above-mentioned object of the present invention is accomplished by an apparatus for promoting the generation of exhaled organic compounds of trees comprising a container for potted trees, and a pot stand means mounted on a bottom of the potted tree container, the pot stand means is comprised of pot trays arranged at intervals so that the pots disposed on respective pot trays are positioned at intervals so that contact can be made between adjacent trees. A water supply means is provided for supplying water to potted trees, and an illuminator is mounted within the potted tree container with a rotating means for rotating all or a part of pot trays. Air is provided by an air suction port for sucking air into the potted tree container, and an air exhauster for discharging air containing volatile organic compounds discharged by potted tree into a room.

In the present invention, the pot stand means may be comprised of pot trays arranged on a circle wherein each pot trays is rotatably held on the bottom of the potted tree container. Further, the pot stand means may be comprised of pot trays arranged on a circle and rotatably held an the bottom of the potted tree container with one other pot stand arranged on a center of the circle wherein said another one pot stand is held stationary to the bottom of the potted tree container. Furthermore, the pot stand means may be comprised of pot trays arranged in staggered parallel three lines. The pot trays arranged in the center of the three lines are held stationary on the bottom of the potted tree container and the pot trays arranged in both side lines of the three lines are rotatably held on the bottom of the potted trees container.

In the present invention, the means for supplying water to the trees is comprised of a water tank, and water supply strings each of which extends from a drain hole of each pot to the surface of the water in the water tank.

Furthermore, in the present invention, the water supply means for supplying water to trees is comprised of a water suction pump and a supply pipe for supplying water to each pot mounted on the delivery side of the suction pump.

In the present invention, the illuminator is of a tubular shape and is mounted along an axial line of the potted tree container so the the trees can be illuminated from the side. Or the illuminator may be mounted on the ceiling of the potted tree container so that the trees can be illuminated from overhead by said illuminator. Or the illuminator is mounted on a side face of the potted tree container so that trees can be illuminated from their sides.

All or a part of trees are rotated while in contact with each other so that each tree is mechanically stimulated by an adjacent tree. The stimulation caused by adjacent trees increases the amount of volatile organic compounds discharged from trees. The atmosphere including volatile organic compound from the trees is supplied to a space for human life which physiologically activates a human being and stabilizes one's mind.

BRIEF DESCRIPTION OF THE DRAWINGS

The above objects, characteristics, novel features and advantages of the present invention will become apparent from following detailed description of the preferred embodiments, with reference to the accompanying drawings which are presented as nonlimiting examples, in which:

FIGS. 1(a)(b) and (c) show an embodiment of an apparatus for promoting generation of exhaled organic compounds of trees, FIG. 1(a) being a vertical section, FIG. 1(b) being a section taken on line 1(a)-(b) of FIG. 1(a), and FIG. 1(c) being a section taken on line 1(c)—1(c) of FIG. 1(a), respectively;

DETAILED DESCRIPTION OF PREFERRED EMBODIMENTS

EXAMPLE 1

Figure 2A:
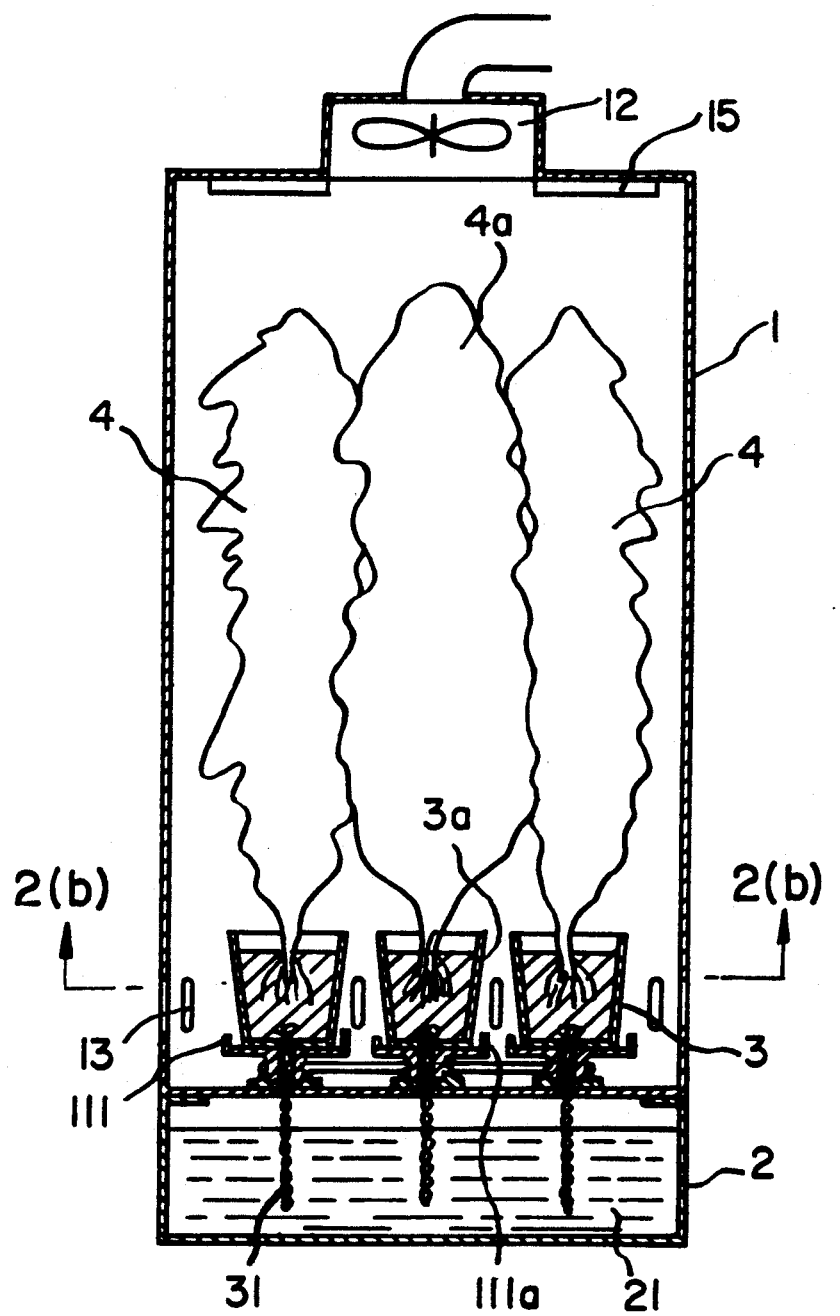
FIGS. 2(a) and (b) show another embodiment of an apparatus for promoting generation of exhaled organic compounds from trees, FIG. 2(a) being a vertical section, and FIG. 2(b) being a section taken on line 2(b)—2(b) of FIG. 2(a), respectively.
Figure 2B:
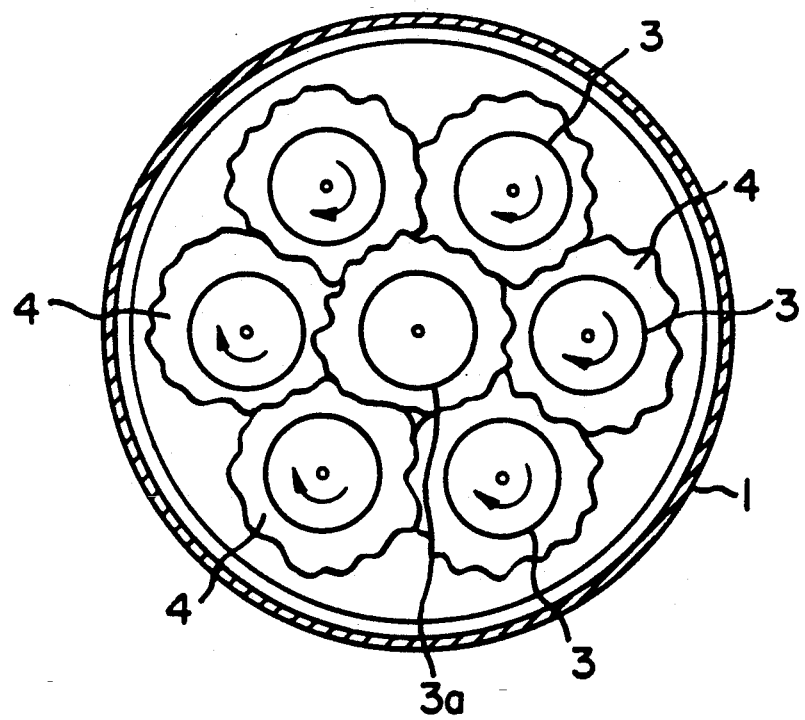

Referring to FIGS. 1(a). an apparatus for promoting generation of exhaled organic compounds from trees is comprised of container 1 for potted trees, pot plate 11 mounted on the bottom of potted tree cotainer 1. Potted tree container 1 has air exhauster 12 mounted on a top, an air suction port 13 provided at the lower part of container 1, illuminator 14 provided within container 1 and a water tank 2 disposed under container 1.

In the above-mentioned apparatus, as shown in FIG. 1(c), illuminator 14 is mounted along the axial line of potted tree container 1. Outside of and around illuminator 14, pot trays 111 are arranged at intervals on a circle each of which is rotatably held on the bottom of potted trees container 1 through pulleys 114. Further, Outside of the circle of pot trays, rotating means 112 for rotating the pot trays is mounted comprised pulleys 112a being interlocked with pulleys 114 of pot trays 111 through belt 113.

Further, a water supply means in the present embodiment is comprised of water tank 2, and water supply strings or wicks 31. A through hole 115 is formed in pot tray 11 extending from a central part of pot tray 111 to the interior of water tank 1. The water supply strings or wicks 31 being down from drain holes of pots 3 to the surface of the water 21.

In the present embodiment, illuminator 14 is tubular in shape and has a light source 141 arranged along an axial line and the circumference of light source 141 is surrounded by outer sleeve 142 made of optically high-transparent and hard substance such as glass 15. Outer sleeve 142 has a tooth formed parallel with an axial line of outer sleeve 142.

Then, motion of the aparatus is explained.

First, water supply wicks 31 have a length extending from drain holes of pots 3 to the surface of the water 21 in water tank 2 is attached to pots 3 and hang down toward the surface of the water, and the trees 4 are put in pots.

Potted trees 4 are put on respective pot trays 111 in a manner such that branches and leaves of adjacent trees and outer sleeve 142 of illuminator 14 come in interfering contact and touch each other.

Under such conditions, the interior of container 1 for potted trees is illuminated by illuminator 14, while respective pet trays 111 are rotated in one direction in which branches and leaves of adjacent trees and the outer sleeve 142 of illuminator 14 come in contact with one another by which respective trees are mechanically stimulated by branches and leaves of an adjacent tree and illuminator 142.

The mechanical stimulation increases the amount of volatile organic compounds of trees discharged from each respective tree 4. Volatile organic compounds from the trees 4 is discharged into a room from potted tree container 1 with air that is sucked into the potted tree container through air suction port 13.

When trees 4 are knoki cypress, it is possible to further increase the amount of volatile organic compounds generated by inoculating the trees with a bacillus of a wax exuding disease.

It is possible to further increase the amount of volatile organic compounds generated by increasing the stimulas provided to the trees by applying a low frequency shock or ultrasonic frequency stimuli to the trees.

EXAMPLE 2

Referring to FIGS. 2(a) and (b), an apparatus for promoting the generation of volatile organic compounds has illuminator 15 mounted on a top face of potted tree container 1 so that the trees are illuminated from overhead by the illuminator, simplifiing the structure. With a view to simplifying the design of the apparatus, the apparatus has a pot tray fixed to a central part of the base of container 1. Tree 4a potted in pot 3a on pot tray 111a does not rotate. However, the central potted tree 4a comes in contact with rotated trees 4 arranged around the central potted tree 4a. In this way central potted tree 4a and trees 4 arranged are stimulated by each other. The remaining structure is the same as that described in Example 1. Therefore the explanation about the other structure is omitted.

EXAMPLE 3

Figure 3A:
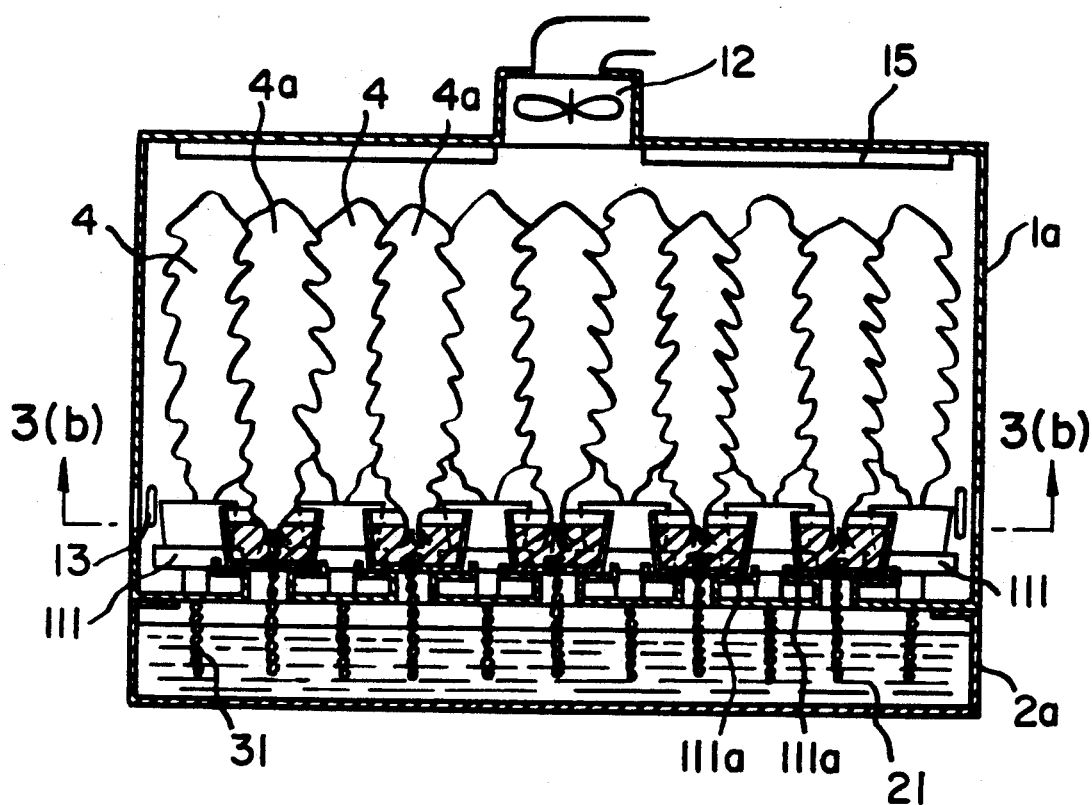
FIGS. 3(a) and (b) show another embodiment of an apparatus for promoting generation of exhaled compounds of trees, FIG. 3(a) being a vertical section, and FIG. 3(b) being a section taken on line 3(b)—(b) of FIG. 3(b), respectively.
Figure 3B:
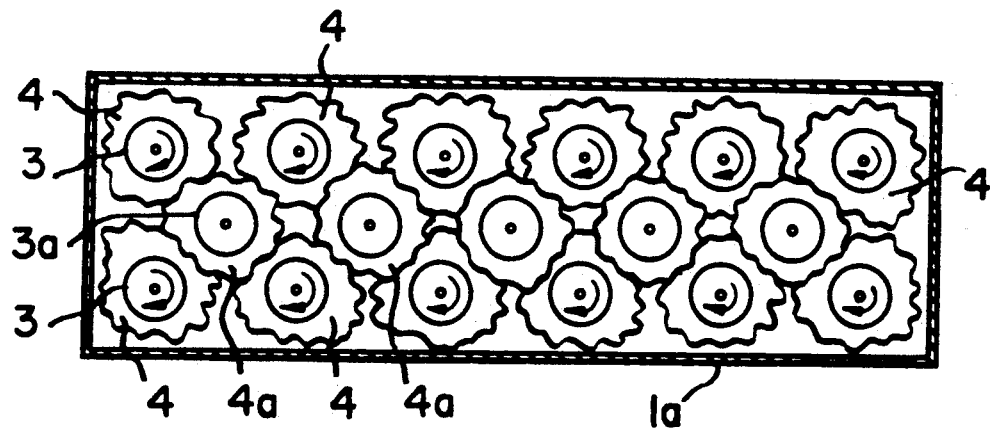

Referring to FIGS. 3(a) and (b), apparatus for promoting the generation of volatile organic compounds has a pot stand means 11 comprised of pot trays arranged in three staggered parallel lines. The pot trays are arranged in the middle line are held or the base of container 1 and pot trays 111 arranged in either side in two lines are rotatably mounted on the base of potted tree container 1, and rotating means 112 for rotating pot trays 111 is arranged for both side lines in a given direction.

In the example illuminator 15 is mounted on the top tray of potted tree container 1a in the same manner as described in Example 2.

The remaining construction is the same as the above-mentioned example, and therefore further explanation is not needed.

In examples 2 and 3, an illuminator may be mounted on the side of potted tree container 1 so that trees can be illuminated from the sides of container 1 for potted trees.

The water supply means may be comprised of a suction pump (not shown) and pipeline for spraying water on each potted tree.

In the above-mentioned examples, it is also possible to provide a blower (not shown) at the position of suction pump 13 so that outside air is blown against the trees to increase mechanical shock to respective trees 4, 4a.

As above-mentioned, because all or a part of trees rotate while in contact with each other, respective trees are mechanically stimulated by adjacent trees. The stimulation given from adjacent trees increases the amount of volatile organic compounds discharged from trees.

Further, air blown on the trees by a blower further increases mechanical shock given to the trees.

Also, because the trees are closely spaced in the inside of the potted tree container, the apparatus according to the present invention is space saving.

What is claimed is:

1. An apparatus for promoting generation of exhaled organic compounds from trees comprising;
   a container for a plurality of potted trees having laterally extending branches;
   pot stand means mounted on the bottom of said container, said pot stand means comprised of a plurality pot trays arranged at intervals so that potted trees disposed on respective pot trays are positioned at intervals such that interfering contact can be made between branches of adjacent trees;
   water supply means for supplying water to said plurality of potted trees;
   illuminating means mounted in said container;
   rotating means for rotating all or part of said pot trays;
   an air suction port for sucking air into said container; and
   air exhaust means for discharging air containing volatile organic compounds released by said plurality of potted trees into a room.

2. An apparatus for promoting generation of exhaled organic compounds from trees as claimed in claim 1 wherein said pot stand means is comprised of pot trays arranged in a circle and each pot tray is rotatably mounted on the bottom of said container.

3. An apparatus for promoting generation of exhaled organic compounds of trees as claimed in claim 2 wherein said pot stand means is comprised of pot trays arranged in a circle wherein each pot tray is rotatably mounted on the bottom of said container, at least one pot stand arranged at the center of said circle of pot trays wherein said at least one pot stand is held stationary on the bottom of said container.

4. An apparatus for promoting generation of exhaled organic compounds of trees as claimed in claim 1 wherein said pot stand means is comprised of a plurality of pot trays arranged in three staggered parallel lines with the pot trays arranged in the center line being held stationary on the bottom of said container and said plurality of pot trays arranged on either side of said center line of pot trays being rotatably mounted on the bottom of said container.

5. An apparatus for promoting generation of exhaled organic compounds of trees as claimed in claim 1 wherein said water supply means for supplying water to said plurality of trees is comprised of a water tank, and water supply strings wherein each of said water supply strings extends from a drain hole of each of said pots to the surface of the water in said water tank.

6. An apparatus for promoting generation of exhaled organic compounds of trees as claimed in claim 1 wherein said water supply means for supplying water to said plurality of trees is comprised of a water suction pump and a supply pipe for supplying water to each of said pots mounted on the delivery side of the suction pump.

7. An apparatus for promoting generation of exhaled organic compounds of trees as claimed in claim wherein said container has a central axis line and said illuminator is of a tubular shape said illuminator being mounted on the axis line of said container so that said plurality of trees are illuminated from the sides.

8. An apparatus for promoting generation of exhaled organic compounds of trees as claimed in claim 1 wherein said container has a ceiling and said illuminator is mounted on the ceiling of said container above said plurality of trees to illuminate said plurality of trees from the overhead by said illuminator.

9. An apparatus for promoting generation of exhaled organic compounds of trees as claimed in claim 1 wherein said container has a plurality of said faces and said illuminator is mounted on a side face of said container so that said plurality of trees is illuminated from the side.

10. Apparatus for improving the environment in a living space with organic compounds released from trees comprising;
    a container;
    a plurality of potted trees having laterally extending branches positioned in said container; said plurality of potted trees being positioned so that the branches of adjacent trees make interfering contact with one another;
    water supply means for supplying water to said plurality of potted trees;
    rotating means for rotating at least one said trees so that said interfering branches of adjacent trees stimulate the release of said organic compounds;
    air exhaust means for discharging air containing said organic compounds released by said plurality of trees into a living space;
    whereby the environment of said living space is improved.

11. The apparatus according to claim 10 wherein said plurality of potted trees are mounted in pot stands on the bottom of said container; said means for rotating said at least one of said potted trees comprising means for rotating at least one of said pot stands.

12. The apparatus according to claim 11 in which said pot stands are arranged in a circle; said container having a single stationary pot stand in the center of said circle; and a potted tree on said pot stand in interfacing relationship with the trees in said circle.

13. The apparatus according to claim 11 in which said plurality of potted trees are arranged in three staggered parallel lines with the potted trees in the center line being stationary and the potted trees in the parallel lines on either side of the trees in the center line being rotatably mounted.

14. The apparatus according to claim 10 including water supply means for supplying water to said trees; said water supply means comprising a reservoir in the bottom of said container; and means delivering said water to each of said plurality of potted trees individually.

15. The apparatus according to claim 14 in which said means for delivering said water to each of said plants comprises a wick immersed in the water in said reservoir extending into each pot.

16. The apparatus according to claim 10 including illuminating means in said container for illuminating said plurality of potted plants.

17. The apparatus according to claim 16 in which said container has a central axis and said illuminating means is a tubular shaped illuminating means mounted in the center of said plurality of trees along the axis of said container for illuminating said plurality of trees from the side.

18. The apparatus according to claim 10 in which said container has a top and said illuminating means is mounted at the top of said container for illuminating said plurality of trees from above.

19. The apparatus according to claim 10 including means for directing air sucked in from outside said container through said plurality of trees to further stimulate release of said organic compounds.

* * * * *